US012784420B2

(12) United States Patent
Cheng

(10) Patent No.: US 12,784,420 B2
(45) Date of Patent: Nov. 3, 2026

(54) METHOD AND APPARATUS FOR USING AN AUGMENTED SAMPLE SET

(71) Applicant: Ya-Jian Cheng, Frisco, TX (US)

(72) Inventor: Ya-Jian Cheng, Frisco, TX (US)

( * ) Notice: Subject to any disclaimer, the term of this patent is extended or adjusted under 35 U.S.C. 154(b) by 0 days.

(21) Appl. No.: 19/541,347

(22) Filed: Feb. 16, 2026

(65) Prior Publication Data

US 2026/0253394 A1 Aug. 27, 2026

Related U.S. Application Data

(63) Continuation of application No. 18/057,123, filed on Nov. 18, 2022, now Pat. No. 12,620,207.

(60) Provisional application No. 63/302,494, filed on Jan. 24, 2022.

(51) Int. Cl.
*G06V 10/25* (2022.01)
*G06V 10/774* (2022.01)

(52) U.S. Cl.
CPC .......... *G06V 10/7747* (2022.01); *G06V 10/25* (2022.01)

(58) Field of Classification Search
CPC .. G06V 10/25; G06V 10/764; G06V 10/7747; G06V 10/82
See application file for complete search history.

(56) References Cited

U.S. PATENT DOCUMENTS

| | | | | |
|---|---|---|---|---|
| 10,346,721 | B2 | 7/2019 | Albright et al. | |
| 10,546,217 | B2 | 1/2020 | Albright et al. | |
| 2019/0130218 | A1 | 5/2019 | Albright et al. | |
| 2019/0258901 | A1 | 8/2019 | Albright et al. | |
| 2020/0117953 | A1* | 4/2020 | Cooper | G06V 10/772 |

* cited by examiner

*Primary Examiner* — Sam Bhattacharya
(74) *Attorney, Agent, or Firm* — Mei & Mark LLP

(57) ABSTRACT

A method and apparatus is provided for generating an augmented sample set for enriching a first training dataset for training a model. The method comprises: using data augmentation and corresponding labeling or using label augmentation to add a first augmented sample set to the first training dataset, wherein the data augmentation and corresponding labeling, or the label augmentation purposely puts a first distinguishing characteristic of a first part-of-interest or an associated label into the first training dataset to cause the first distinguishing characteristic of the first part-of-interest to be emphasized to enable the model to learn a generalizable principle of the first distinguishing characteristic, wherein the first distinguishing characteristic is for differentiating the first part-of-interest from a second part-of-interest. Methods for training a model, using a model to differentiate part-of-interests and using a model to infer a dataset are also provided.

16 Claims, 11 Drawing Sheets

METHOD AND APPARATUS FOR USING AN AUGMENTED SAMPLE SET

PRIORITY

This application is a continuation of and claims the benefit of priority of U.S. Ser. No. 18/057,123 filed Nov. 18, 2022 which claims the benefit of US provisional patent application U.S. 63/302,494 filed Jan. 24, 2022, all of which are incorporated herein by reference.

BACKGROUND OF DISCLOSURE

1. Field of Disclosure

The present application relates to data processing, and more particularly, to a method and apparatus for generating an augmented sample set.

2. Description of Related Art

This background section introduces aspects that may facilitate a better understanding of the disclosure. Accordingly, the statements of this section are to be read in this light and are not to be understood as admissions about what is in the prior art or what is not in the prior art.

A common mistake of Artificial Intelligence (AI) models is that they might have a higher response to non-distinguishing part of the image, such as the background (more pixels) of an image but not an interesting object of the image since the background occupies more pixels than the interesting object. For example, if one searches "wolf" on a web search engine, lots of images with snowy backgrounds are obtained. But if one searches "dog", images with almost no snowy backgrounds are obtained. Training an AI Neural Network (NN) to detect the wolf with such naturally biased images, NN is easily biased to think its job is to detect snow, while the NN designer thinks the NN's job ought to be detecting the wolf. For a medical NN, the NN often fails on rare conditions, which are usually dangerous ones. For example, melanoma is more dangerous and rare than acne. And a skin disease detecting NN is more likely to wrongly reject melanoma than acne.

In an example of developing a medical AI to reject False Positives in Cardiac Pause, a three-second Pause is considered short and a 10-seconds Pause is considered long. Longer Pauses are more dangerous. But one can find that when an ECG recorder detects a 10-seconds Pause, 99% chance it is a loss of contact False Pause. The mechanism behind this is similar to that 99% of the tornado alarms a person has ever heard are usually False Alarms, because true tornados are rare and a person is not likely to survive multiple true tornados. Therefore, when trained with naturally biased data, NN is naturally biased to think that long Pauses are False.

If one made two medical AIs, a High Sensitivity one and a Low Sensitivity one, the High Sensitivity AI will wrongly reject 0.5% of True Pauses and all of them are 10-seconds Pause (dangerous and rare). The Low Sensitivity AI will wrongly reject 5% of True Pauses and all of them are 3-seconds Pause (less dangerous and less rare). The irony is that some High Sensitivity AI is easier to make, easier to be approved, and is unfortunately more dangerous.

In existing art, some propose to train an AI model by a training dataset that randomly arbitrarily utilizes subsets of a sample for generating each augmented sample, some propose to use label augmentation which unselectively transforms distinguishing and non-distinguishing characteristics or use label augmentation which selectively transforms subsets of the samples but still unselectively transforms the distinguishing and non-distinguishing characteristics, and some propose to train a model by memorizing a rare sample instead of learning a more generalizable principle of the distinguishing characteristic in the rare sample. All these proposals are not a solution to the above-identified problem.

SUMMARY

An objective of the present application is to provide a method and apparatus for generating an augmented sample set for solving the problems in the existing art.

In a first aspect, an embodiment of the present application provides a method for generating an augmented sample set for enriching a first training dataset for training a first model for differentiating a plurality of parts-of-interest from each other, wherein the parts-of-interest comprises a first part-of-interest and a second part-of-interest, comprising: using data augmentation and corresponding labeling or using label augmentation to add a first augmented sample set to the first training dataset, wherein the data augmentation and corresponding labeling, or the label augmentation purposely puts a first distinguishing characteristic of the first part-of-interest or an associated label into the first training dataset to cause the first distinguishing characteristic of the first part-of-interest to be emphasized to enable the first model to learn a generalizable principle of the first distinguishing characteristic, wherein the first distinguishing characteristic is for differentiating the first part-of-interest from the second part-of-interest.

In a second aspect, an embodiment of the present application provides a method for training, using a second training dataset enriched by a second augmented sample set generated by the afore-described method, a second model for differentiating a plurality of third parts-of-interest from each other.

In a third aspect, an embodiment of the present application provides, a method for using a second model to differentiate a plurality of third parts-of-interest from each other, wherein the second model is trained using a second training dataset enriched by a second augmented sample set generated by the afore-described method.

In a fourth aspect, an embodiment of the present application provides, a method for using a second model to infer the first dataset, wherein the second model is for differentiating a plurality of third parts-of-interest from each other and is trained using a second training dataset enriched by a second augmented sample set generated by the afore-described method.

In a fifth aspect, an embodiment of the present application provides a method for generating an augmented sample set for enriching a first training dataset for training a first model for differentiating a plurality of parts-of-interest from each other, wherein the parts-of-interest comprises a first part-of-interest and a second part-of-interest, comprising: a data augmentation step for using the data augmentation to cause the first distinguishing characteristic of the first part-of-interest to have a first appearance and a first non-distinguishing characteristic of the first part-of-interest to have a second appearance in the first augmented sample set, wherein the first appearance and the second appearance are differential, and wherein the first model is prone to overfit to the first non-distinguishing characteristic when differentiating the first part-of-interest from the second part-of-interest;

and a labeling step for labeling according to the differential first appearance and second appearance.

In a sixth aspect, an embodiment of the present application provides an apparatus for generating an augmented sample set for enriching a first training dataset for training a first model for differentiating a plurality of parts-of-interest from each other, the parts-of-interest comprising a first part-of-interest and a second part-of-interest, wherein the apparatus comprises a memory storing a plurality of program instructions and a processor coupled to the memory, wherein the program instructions, when called or run by the processor, cause the processor to execute the step of: using data augmentation and corresponding labeling or using label augmentation to add a first augmented sample set to the first training dataset, wherein the data augmentation and corresponding labeling, or the label augmentation purposely puts a first distinguishing characteristic of the first part-of-interest or an associated label into the first training dataset to cause the first distinguishing characteristic of the first part-of-interest to be emphasized to enable the first model to learn a generalizable principle of the first distinguishing characteristic, wherein the first distinguishing characteristic is for differentiating the first part-of-interest from the second part-of-interest.

In a seventh aspect, an embodiment of the present application provides a computer-readable storage medium provided for storing a computer program, which enables a computer to execute any of the afore-described methods.

In an eighth aspect, an embodiment of the present application provides a computer program product, which includes computer program instructions enabling a computer to execute any of the afore-described methods.

In a ninth aspect, an embodiment of the present application provides a computer program, when running on a computer, enabling the computer to execute any of the afore-described methods.

In the method and apparatus for generating an augmented sample set provided in the present application, the data augmentation and corresponding labeling or the label augmentation are used to add an augmented sample set to the training dataset for training the model for differentiating a part-of-interest from a differential part-of-interest. The data augmentation and corresponding labeling, or the label augmentation purposely puts a first distinguishing characteristic of the first part-of-interest or an associated label into the first training dataset to enable the model to learn a generalizable principle of the first distinguishing characteristic. By the augmented sample set, the model is taught to emphasize or pay more attention to the first distinguishing characteristic (e.g., features of cancerous cells) of the first part-of-interest (e.g., a cancer image) that is for differentiating the first part-of-interest from the second part-of-interest (e.g., a non-cancer image). The method of the present application avoids the drawbacks of a model trained to memorize a rare sample instead of learning a more generalizable principle of a distinguishing characteristic in the rare sample; a model trained by a training dataset that arbitrarily combines subsets of a sample for generating each augmented sample; a model trained using label augmentation which unselectively transforms the distinguishing and non-distinguishing characteristic; a model trained using label augmentation which selectively transforms subsets of the samples but still unselectively transforms the distinguishing and non-distinguishing characteristic; and etc. The method of the present application can improve the performance of a model for differentiating a part-of-interest from a differential part-of-interest. In some applications, the method of the present application enables an establishment of a model that can reduce the occurrence of a blunt mistake or a failure in rare cases. The method of the present application is applicable to some scenarios in which it is dangerous when a model makes mistakes, and is especially applicable to, but not limited to, medical cases or anomaly detection.

BRIEF DESCRIPTION OF DRAWINGS

In order to more clearly illustrate the embodiments of the present application or related art, the following figures that will be described in the embodiments are briefly introduced. It is obvious that the drawings are merely some embodiments of the present application, a person having ordinary skills in this field can obtain other figures according to these figures.

DETAILED DESCRIPTION OF EMBODIMENTS

Embodiments of the present application are described in detail with the technical matters, structural features, achieved objects, and effects with reference to the accompanying drawings as follows. Specifically, the terminologies in the embodiments of the present application are merely for describing the purpose of the certain embodiment, but not to limit the disclosure.

In this document, the term "/" should be interpreted to indicate "and/or." As used herein in the specification and the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Figure 1:
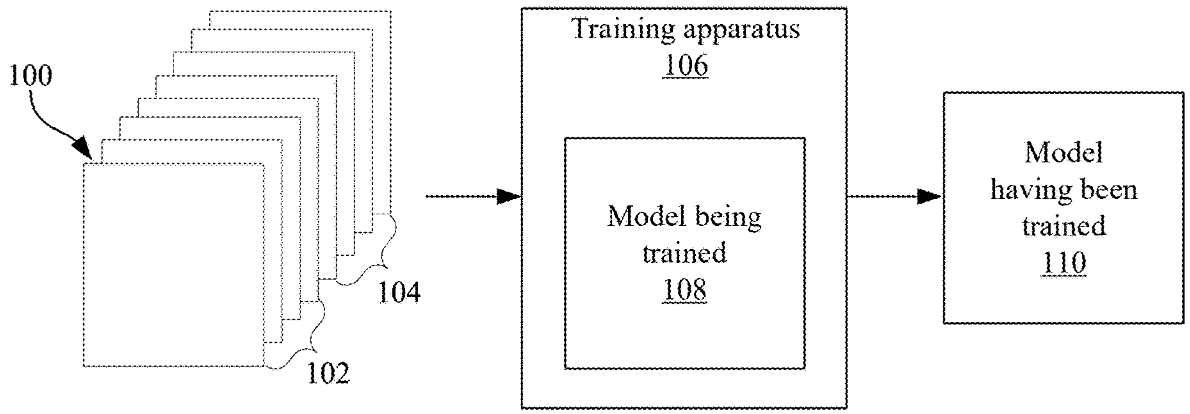
FIG. 1 is a schematic diagram illustrating a training apparatus according to an embodiment of the present application.

FIG. 1 is a schematic diagram illustrating a training apparatus according to an embodiment of the present application. As shown in FIG. 1, a training apparatus 106 is used to train a model 108 (i.e., a model being trained) by using a training dataset 100 to obtain a trained model 110 (i.e., a model having been trained) for classifying or predicting something. The training dataset 100 may consist of a traditional sample set 102 and an augmented sample set 104. The augmented sample set 104 is generated by data augmentation or label augmentation for enriching the training dataset 100 to train the model 108 for differentiating a plurality of parts-of-interest from each other.

The training apparatus 106 can be made up by one or more portable/wearable/implantable/personal/server computers, or one or more servers on the cloud providing one or more models for training user data, or one or more servers on the cloud providing a service for training data from one or more users, or one or more devices or one or more servers on the cloud providing an augmented sample set for training a model. The trained model 110 can be installed or performed on implantable devices, wearable devices, portable devices, personal computers, laptop computers, workstations, or robots, or on the cloud. A result (last layer's output or outputs of an AI model or an ensemble of models) or a representation (middle layer's output or outputs of an AI model or of an ensemble of models) predicted from the trained model 110 can be used to alter treatment (such as recommending a doctor to subscribe drug X), diagnosis, follow-up examinations, lifestyle suggestions (such as eating less salts), device settings (such as turning on Wi-Fi or Bluetooth, recording activity more often, utilizing higher data compression, recording less physiological signal(s), or send more alerts), or to call or alert doctors/caregiver/911, to change user profiles (preferences of a user in a website or a computation device). The model 108 or 110 can be an artificial intelligence (AI) model, a linear or non-linear regression model, a neural network (NN) model, a deep neural network (DNN), an ensemble of multiple models, etc.

The output of model being trained 108 or the model having been trained 110 can be a classifier with a label, which is binary, either 0 or 1, or a regressor with a label, which is an integer or a real number, or a reconstructor that maps pixels between a first image and a second image, for example.

A traditional model is susceptible to having a higher response to non-distinguishing characteristic than distinguishing characteristic when training the model to classify or predict something. For instance, a background on an image may get more attention than an interesting object since the background occupies more pixels than the interesting object. This may result in a blunt mistake or a failure in rare cases. Sometimes, this is dangerous, especially in medical cases, such as the determination of a tumor (malignant vs benign), a skin disease (melanoma vs acne), or diagnosis of AF (which means Atrial Fibrillation or Atrial Flutter in this writing) vs PAC (which means premature atrial contractions) and etc.

By using data augmentation or label augmentation, this application is to teach the model to focus on a distinguishing part that is deemed important or less deceiving or would be helpful to have better outcomes. For example, rather than predicting a person's gender based solely on the clothes, the model will predict gender more based on facial and bodily features.

Figure 2:
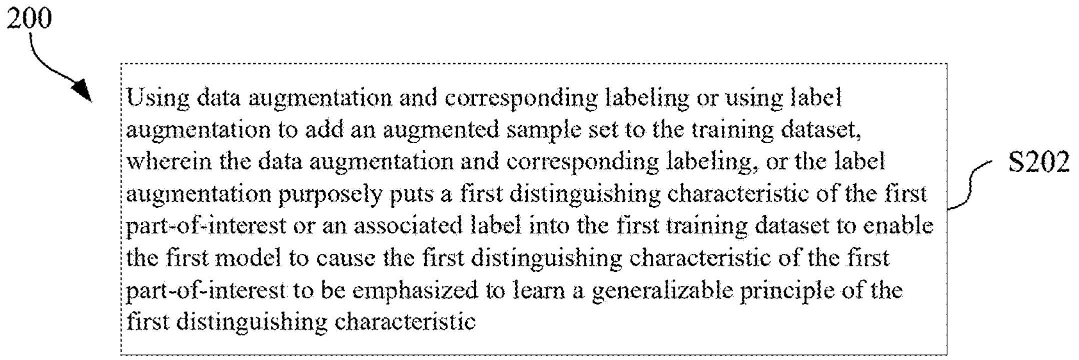
FIG. 2 is a flowchart of a method for generating an augmented sample set according to an embodiment of the present application.

FIG. 2 is a flowchart of a method 200 for generating an augmented sample set according to an embodiment of the present application. This method is for enlarging an amount of sample data for enriching a training dataset to train the model to differentiate a plurality of parts-of-interest from each other. Each of the parts-of-interest may be an image or a part of an image and probably can be found from an image set or subset of a traditional training dataset. In addition to being an image or a part of an image, the parts-of-interest can be other sample data, which can be 1D, 2D, 3D, 4D sample data, or sample data with any number of dimensions, or any other forms of data. In a simplified case, the parts-of-interest include a first part-of-interest and a second part-of-interest, for example, an interesting object and a background, a region of cancerous tissues and a region of non-cancerous tissues, AF cardiac signal and benign cardiac signal, etc.

The method 200 includes the following steps:

In Step S202, data augmentation and corresponding labeling or label augmentation are used to add an augmented sample set to the training dataset, wherein the data augmentation and corresponding labeling, or the label augmentation puts distinguishing characteristic(s) of the first part-of-interest or an associated label into the first training dataset to cause the distinguishing characteristic(s) of the first part-of-interest to be emphasized to enable the model to learn a generalizable principle of the first distinguishing characteristic. The data augmentation and corresponding labeling or the label augmentation may also cause non-distinguishing characteristic(s) of the first part-of-interest to be de-emphasized.

The distinguishing characteristic(s) is defined as: characteristic(s) that help AI distinguish better. The distinguishing characteristic(s) of a part-of-interest may be considered as being distinguishing based on the purpose of AI training. For example, if the model is trained to identify cancerous cells or identify whether cancerous cells are involved in an image, cancerous parts that can be identified by human experts or by another AI algorithm or by any appropriate means can be deemed as a distinguishing characteristic. Other unimportant characteristics or other characteristics except for the distinguishing characteristic(s) can be considered as non-distinguishing characteristics. In another example, snow may not be a distinguishing characteristic, but an animal's face is a distinguishing characteristic for a dog/wolf classification AI. For another example, the color of a house's roof may not be a distinguishing characteristic for a housing price regression AI, but distances from good schools are. What is distinguishing depends on the AI's application and AI's error. In certain circumstances, the distinguishing characteristic(s) may be construed as essential or critical (or contrasting or differential or discriminatory or discriminative or diacritical) characteristic(s) while the non-distinguishing characteristic(s) may be construed as non-essential or non-critical (or non-contrasting or non-differential or non-discriminatory or non-discriminative or non-diacritical) characteristic(s).

Figure 3A:
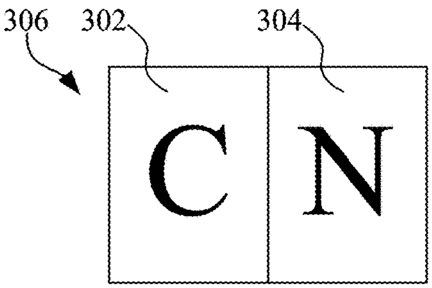
FIG. 3A is a schematic diagram showing a first type of data sample according to an embodiment of the present application.

In an exemplary example, as illustrated in FIG. 3A, there are a first part-of-interest 302 and a second part-of-interest 304. The first part-of-interest 302 may be a cancer image C with cancer or with cancerous cells or from a part of the cancer image C. The second part-of-interest 304 may be a non-cancer image N without cancer or with a benign tumor or from a part of the non-cancer image N. The first part-of-interest 302 (e.g., the cancer image C) and the second part-of-interest 304 (e.g., the non-cancer image N) are combined together as a sample that is fed into the model to train the model. More specifically, one may transform a cancer image C and a non-cancer image N (with or without individual or combinations of the following transformations: zooming, resizing, overlapping, shearing, noise-adding, superimposition with other signals, covering, skipping, rotation, translation, brightness/contrast/saturation modulation, color adjusting/swapping/zeroing, scaling, flipping, cropping, non-linear deforming, filtering, sharpening, blurring, edge detection, quantization, resolution adjustment, compressing, companding, look-up table encoding. These transformations can be applied to part or whole of an image. In some other cases, these transformations can be applied to 3D (x-y-color, x-y-time, x-y-z) or 4D (x-y-color-depth, x-y-z-color, x-y-color1-color2, x-y-z-time) cases, or sample data with any number of dimensions) and put together to synthesize image 306 that has the cancer image C (optionally transformed) on the left and the non-cancer image N (optionally transformed) on the right, for example. Alternatively, the synthesized image 306 may be obtained by simply putting the cancer image C and the non-cancer image N side by side, with or without overlap. The cancer image C and/or the non-cancer image N may have any arbitrary shape and may be assembled into another image or be put together in various ways, such as based on irregular mosaic patterns or patterns generated by Fortune's algorithm. Once the synthesized image 306 is obtained, this image can be used as a sample to train the model (sometimes together with the cancer image C and the non-cancer image N). That is, an amount of training sample data is enlarged. The synthesized image 306 is a sample of an augmented sample set. Since the synthesized image 306 as a whole includes cancerous parts, a label (e.g., "Does the image 306 contain cancer?") of the synthesized image 306 may also be fed into the model together with the synthesized image 306 to train the model more comprehensively. The history of data augmentation and optional transformations could optionally also be fed into the model to perform multi-task training (e.g., "Is C on the left side of image 306?", "Percentage of the area that C occupied in the image 306?", "Where is the boundary between C and N in image 306?", "Is C zoomed in more than 4 times?"). It is noted that the synthesized image 306 may serve as an input of a neural network of the model and the corresponding augmented label(s) may serve as an output of the neural network of the model.

Figure 3B:
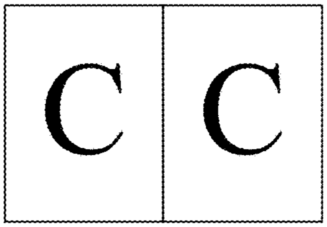
FIG. 3B is a schematic diagram showing a second type of data sample according to an embodiment of the present application.
Figure 3C:
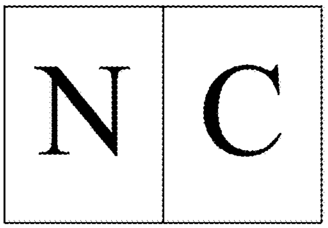
FIG. 3C is a schematic diagram showing a third type of data sample according to an embodiment of the present application.
Figure 3D:
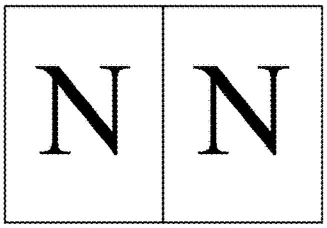
FIG. 3D is a schematic diagram showing a fourth type of data sample according to an embodiment of the present application.

In some embodiments, the augmented sample set includes a first sample that has an artifact (e.g., a central vertical line shown in FIG. 3A) caused by the data augmentation, and the augmented sample set further includes a second sample that has the artifact (e.g., a central vertical line shown in FIG. 3D) caused by the data augmentation and has a second label value (e.g., "Contains C=0") differential with respect to a first label value (e.g., "Contains C=1") of the first sample (Categorical encoding labeling). Or each sample can have two binary labels such as "Contains C" and "Contains no C" (One-hot encoding labeling). The outcome of labeling would be "Contains no C=1 for 3A; Contains C=0 for 3D". In general, by including some negative samples (e.g., FIG. 3D) that have the artifact caused by data augmentation, an AI model is less likely to overfit to the correlation between the artifact and positive samples (e.g., FIGS. 3A, 3B, and 3C).

In addition to the data augmentation and corresponding label augmentation, label augmentation can also be acquired from metadata such as patient history. In a concrete example, it is sometimes difficult for a pathologist to judge based solely on a histology image (e.g., a HE staining image). Therefore, immune staining (e.g., P504S staining) may be involved. If a pathology sample has the HE staining image and a corresponding immune staining image, usually it means the HE staining image itself is difficult to reach conclusion or the HE staining image looks suspicious. Therefore, whether a HE staining image has a corresponding immune staining image contains medical information for AI training. For example, each HE staining image was labeled as "Contains Cancer"=1 or 0 or any other likelihood. And only a subset of the HE staining images comes with immune staining. We could use an extra label "This HE has immune staining=1" to train AI that this is a difficult sample, regardless it is a Cancer or Not. And we could use "This HE has immune staining=0" to teach AI that this is a simple sample, regardless it is a Cancer or Not. The above two labels "Contains Cancer" and "This HE has immune staining" could be binary, real numbered, categorical, or one hot encoded, or combinations of the above and other common encoding techniques. The two labels can be trained simultaneously (multi-task learning) or in series (curriculum learning). Similarly, many patient histories could be used to engineer labels to enhance differentiating part-of-interest from each other and thus can optionally be used in a similar way. Examples of such extra labels are "Whether the patient die in 1 year?", "Whether this patient has comorbidities?", "Age of the patient", "Gender of the patient", "BMI of the patient", "Average blood pressure of the patient". By such label augmentation through data collection, the model can discover unseen associations and solve the problems in the existing art. Which metadata is helpful and should be selected depends on the applications and errors of the AI being trained.

In some embodiments, a labeling step (e.g., with a label "This HE contains cancer") is performed for the main task of differentiating the parts-of-interest using the first distinguishing characteristic and another labeling step (e.g., with a label "This HE has immune staining") is performed for at least one auxiliary task that assists the model to perform the main task using a characteristic relevant to the main task. At least one auxiliary task may be specific to a mechanism of the data augmentation.

The data augmentation and corresponding labeling, or the label augmentation are to "purposely" put a first distinguishing characteristic of the first part-of-interest or an associated label into the first training dataset to cause the first distinguishing characteristic of the first part-of-interest to be emphasized to enable the model to learn a generalizable principle of the first distinguishing characteristic. For example, in the exemplary example shown in FIG. 3A, since a first distinguishing characteristic (i.e., all of or a part of the cancerous cells or cancerous tissues) of the first part-of-interest (e.g., the image C that contains cancerous tissues) and its corresponding label "Cancer" are purposely fed into the model, the model is encouraged to pay more attention to the distinguishing characteristic in comparison to the features shown on the non-cancer image N. This is because the model is encouraged to associate cancerous cells with the cancer image C. The C part in image 306 is for AI to differentiate the cancerous part from the normal part because at least partly due to the augmented labeling asks the model to predict whether C is on the left or right side. In the label augmentation using patient history, the model is encouraged to associate a HE staining image that also has an immune staining image with difficult pathology in the HE; therefore the model is further encouraged to learn features of difficult HE pathology, e.g., atypical cancerous cells in an HE image. That is, the data augmentation and corresponding labeling, or the label augmentation enable the model to emphasize or pay attention to the first distinguishing characteristic (e.g., features of cancerous cells) of the first part-of-interest to learn a generalizable principle of the first distinguishing characteristic for differentiating the first part-of-interest (e.g., a cancerous image) from the second part-of-interest (e.g., a non-cancerous image).

In some embodiments, first data in a first standard (e.g., immune staining) is used as an augmented label for reconstructing the first data from second data in a second standard (e.g., HE staining). The augmented sample set includes the second data with the augmented label. Before reconstructing, the first data, a first appearance of the first distinguishing characteristic is clear for the first distinguishing characteristic to be distinguishing (e.g., an immune staining image could improve diagnosis accuracy better than when only HE staining is available) and in the second data, a second appearance of the first distinguishing characteristic is not as clear as the first appearance (e.g., a HE staining image is less accurate in determining cancer). Therefore, when we give an AI model a HE staining image and ask the model to reconstruct pixel intensities of the corresponding immune staining image, we are encouraging AI to virtually immune stain the HE image. If an AI model could determine which part of the tissue will have high immune staining responses based solely on the HE image, the AI has learned at least some differentiating characteristics of Cancer. While using this reconstruction training, transformations described above can be optionally applied to modify the first and second appearances. The first standard and second standard can be swapped depending on the types of errors and application goals.

In some embodiments, data collection is used to collect two parts (or two data samples) in a second standard (e.g., HE staining). One of the two parts (or the two data samples) is in a first state of having corresponding data in a first standard (e.g., immune staining), and the other of the two parts (or two data samples) is in a second state of not having corresponding data in the first standard (e.g., immune staining). The label augmentation is used to label according to the first state and the second state. For example, one of the two parts is labeled as "has immune staining=1" if it has immune staining or has corresponding immune staining data, and the other one of the two parts is labeled as "has immune staining=0" if it does not have immune staining or does not have corresponding immune staining data. The original label "Is Cancer" could be optionally used as multitask learning or curriculum learning. Between the two parts, the first distinguishing characteristic of the first part-of-interest has a first differentiable degree and the first non-distinguishing characteristic of the first part-of-interest has a second differentiable degree. The first differentiable degree and the second differentiable degree are differential. The model is prone to overfit the first non-distinguishing characteristic when differentiating the first part-of-interest from the second part-of-interest.

In the method 200 for generating an augmented sample set provided in the present application, the data augmentation, and corresponding labeling or the label augmentation are used to add an augmented sample set to the training dataset for training the model for differentiating a part-of-interest from a differential part-of-interest. The data augmentation and corresponding labeling, or the label augmentation purposely puts a first distinguishing characteristic of the first part-of-interest or an associated label into the first training dataset to enable the model to learn a generalizable principle of the first distinguishing characteristic. By the augmented sample set, the model is taught to emphasize or pay more attention to the first distinguishing characteristic (e.g., features of cancerous cells) of the first part-of-interest (e.g., a cancer image) that is for differentiating the first part-of-interest from the second part-of-interest (e.g., a non-cancerous image). The method 200 avoids the drawbacks of a model trained to memorize a rare sample instead of learning a more generalizable principle of a distinguishing characteristic in the rare sample, a model trained by a training dataset that arbitrarily combines subsets of a sample for generating each augmented sample, a model trained using label augmentation which unselectively treats the distinguishing vs non-distinguishing characteristics, a model trained using label augmentation which selectively transforms subsets of the samples but still unselectively transforms the distinguishing and non-distinguishing characteristic, and etc. The method 200 of the present application can improve the performance of a model for differentiating a part-of-interest from a differential part-of-interest. In some applications, the method 200 of the present application enables a model to be trained to have a trained model that can reduce the occurrence of a blunt mistake or a failure in rare cases. The method 200 of the present application is applicable to some scenarios in which it is dangerous when a model makes mistakes and is especially applicable to, but not limited to, medical cases or anomaly detection.

In the exemplary example of determination on whether there are cancerous cells, at least one additional combination of the parts-of-interest may be treated as a sample of the augmented sample set and provided to train the model. For example, as shown in FIGS. 3A to 3D, in addition to the combination including one cancer image C on the left and one non-cancer image N on the right (see FIG. 3A), there may have at least one of a combination including two cancer images C (see FIG. 3B), a combination including one non-cancer image N on the left and one cancer image C on the right (see FIG. 3C), or a combination including two non-cancer images N (see FIG. 3D), which can also be provided to train the model. At least one additional combination of the parts-of-interest may assist the model to learn to know that not all of the samples synthesized from two individual images on the left and on the right respectively tends to indicate "Have cancerous cells" or "Have no cancerous cells". It is noted that exhaustive combinations of the parts-of-interest or an exhaustive set of the combinations or a subset of the exhaustive combinations of the parts-of-interest may be fed into the model for balancing those trained results. For example, all the four combinations illustrated in FIGS. 3A to 3D are used in training the model. It is also noted that when the number of combinations is large, only a part of the combinations of the exhaustive set may be used. For example, the combinations may be selected based on the application requirement of the model. The more severe the application requirement, the larger the number of combinations. Alternatively, some combinations may lead to a small prediction error, and therefore the combinations may be selected based on the prediction error. In some situations, an expert knows which combination or which combinations help avoid errors. The helpful combinations may be weighted more in random or manual selections. In some situations, the positive combinations (FIGS. 3A, 3B, and 3C) can occupy, for example, 70% of the augmented data while the negative combinations (FIG. 3D) can occupy only 30%, in order to achieve higher sensitivity to meet arbitrary design requirement.

Figure 6A:
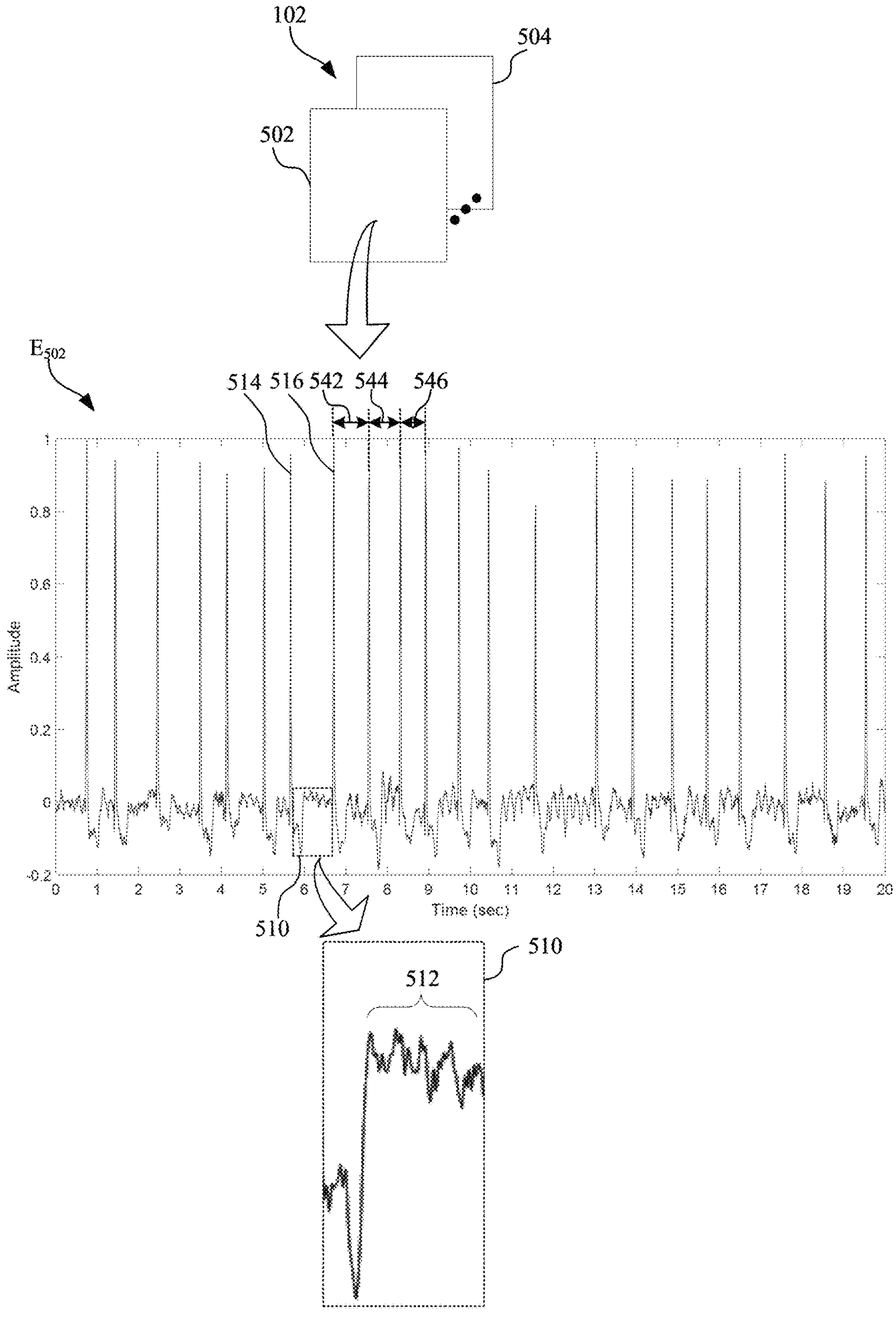
FIG. 6A is a schematic diagram showing a first type of data sample according to an embodiment of the present application.
Figure 6B:
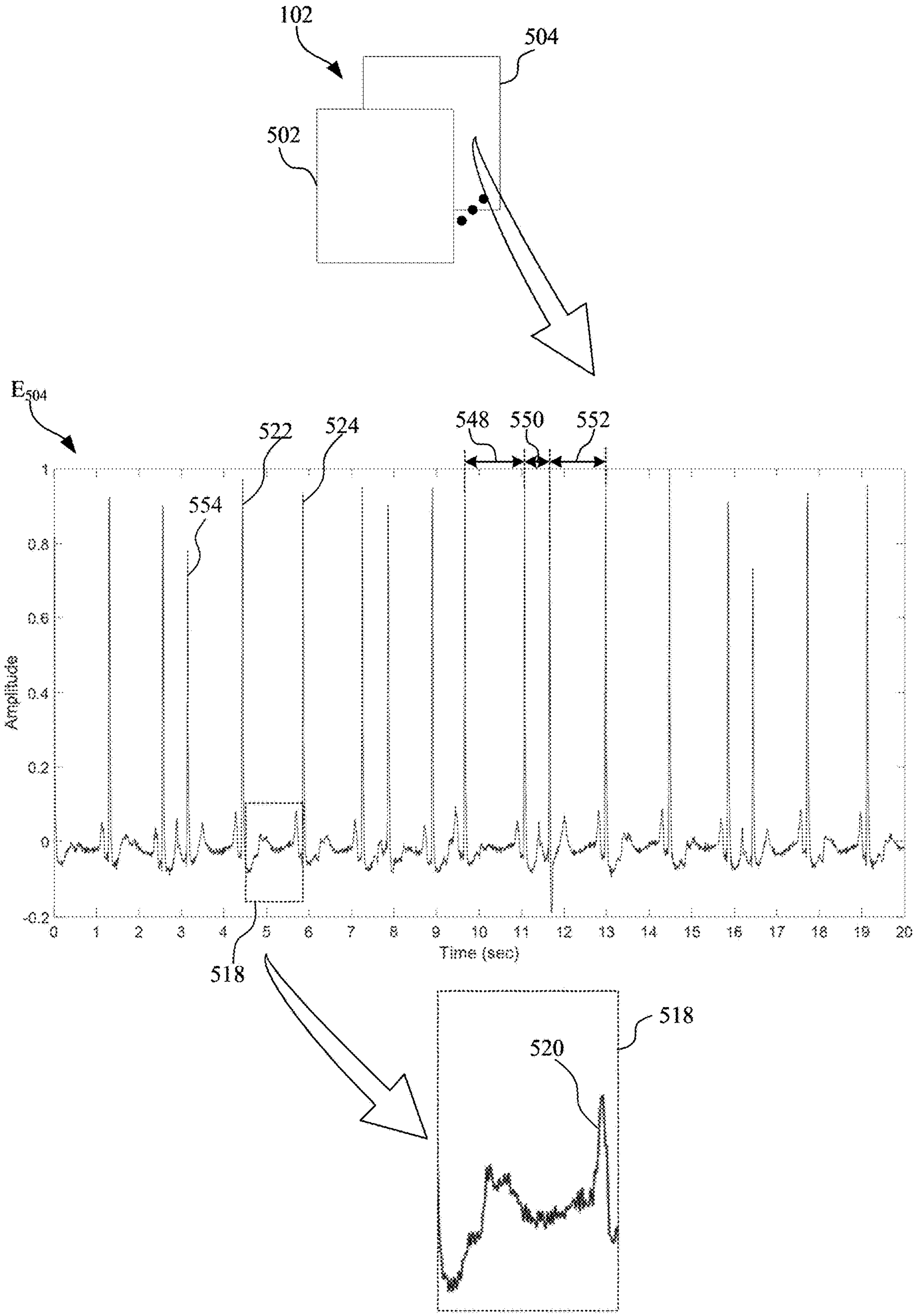
FIG. 6B is a schematic diagram showing a second type of data sample according to an embodiment of the present application.

FIG. 6A is a schematic diagram illustrating an electrocardiogram (ECG) of atrial flutter (AF). The same principle below applies to atrial fibrillation, which is also abbreviated as AF. The same principle applies not only to ECG, but also to other cardiac signals such as EGM (electrogram), optic sensors cardiac signals (such as photoplethysmography sensor), and ballistocardiogram (BGM). FIG. 6B is a schematic diagram illustrating an ECG of premature atrial contractions (PAC). Both AF and PAC are not normal. However, AF is more dangerous than PAC. AF may cause stroke or death, while PAC is mostly benign. Compared to the sinus rhythm (i.e., normal cardiac rhythm), both AF and PAC have relatively more unstable RR intervals. Therefore, a model sometimes misclassifies PAC with AF or vice versa. It is unsafe for a patient if his/her AF is misclassified as PAC and thus misses treatment opportunities. On the other hand, when PAC is misclassified as AF, it causes unnecessary false alerts and wastes reviewing resources and/or possible wrong treatments. Compared to AF, PAC is more abundant and more available in a general dataset. If such naturally biased data samples are used to train a model, the model will have a higher response to PAC than AF. That is, the model will likely classify an AF as PAC. Although lowering the AF-detection threshold could increase the true detection rate of AF, it also unfortunately increases the false detection rate (and thus misclassify PAC as AF). This type of mistake can be avoided or reduced by the present application by teaching the model to learn rare cases or to pay attention to the distinguishing characteristic such as the morphology of P waves.

In another exemplary example, referring to FIGS. 6A and 6B, a first part-of-interest $E_{502}$ may be an AF, and a second part-of-interest $E_{504}$ may be a PAC. As shown in FIG. 6A, the AF is characterized by multiple P waves (or a wavering 'saw tooth' shaped waveform) 512, instead of a single and distinct P wave in an RR interval (the interval between two neighboring R waves, e.g., 514 and 516). As shown in FIG. 6B, the PAC is characterized by a distinct P wave 520 during an RR interval or between two R waves. The first part-of-interest $E_{502}$ (e.g., the AF) and the second part-of-interest $E_{504}$ (e.g., the PAC) are synthesized to have synthesized data (e.g., an image containing AF and PAC features). The synthesized data and its corresponding label (e.g., "isAF", could be categorical, one hot, vector representation, or real number.) are fed into the model to train the model to pay attention to the distinguishing characteristic (e.g., a wavering waveform 512 with no single distinct P wave in an RR interval). For example, the synthesized data may be obtained by putting the AF waveform on the left of a synthesized time series or image and the PAC waveform on the right of the synthesized time series or image, or by superimposing the AF and the PAC, or by linearly or nonlinearly transforming the AF and/or the PAC and then putting them together. Possible optional transformations include zooming, resizing, overlapping, noise-adding, shearing, superimposition with other signals, covering, skipping, phase velocity adjustment, time-shifting, translation, brightness/contrast/saturation modulation in applicable formats, color adjusting/swapping/zeroing in applicable formats, scaling, flipping, cropping, non-linear deforming, filtering, sharpening, blurring, edge detection, quantization, resolution adjustment, compressing, companding, look-up table encoding. These transformations can be applied to part or whole of the signals. In some other cases, these transformations can be applied to 3D (x-y-color, x-y-time, x-y-z) or 4D (x-y-color-depth, x-y-z-color, x-y-color1-color2, x-y-z-time) cases, or sample data with any number of dimensions. Other approaches to obtain the synthesized time series or image would also be acceptable.

Figure 4:
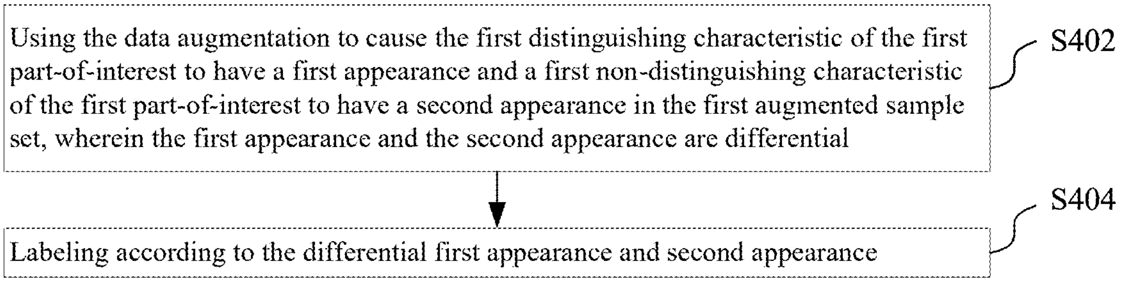
FIG. 4 is a flowchart of using data augmentation and corresponding labeling to add the augmented sample set according to an embodiment of the present application.

FIG. 4 is a flowchart of using data augmentation and corresponding labeling to add the augmented sample set according to an embodiment of the present application. In Step S202 of the method 200, the step of using the data augmentation and corresponding labeling to add the augmented sample set may include the following steps.

In Step S402, the data augmentation is used to cause the first distinguishing characteristic of the first part-of-interest to have a first appearance and a first non-distinguishing characteristic of the first part-of-interest to have a second appearance in the first augmented sample set, wherein the first appearance and the second appearance are differential.

In the augmented sample set, a first distinguishing characteristic of the first part-of-interest is caused to have a first appearance and a first non-distinguishing characteristic of the first part-of-interest is caused to have a second appearance. In an exemplary example, the AF shown in FIG. 6A may be nonlinearly transformed such that the wavering waveform 512 with no single distinct P wave is magnified while the magnitude of the R waves 514 and 516 are less magnified so that the magnitude ratio between 512 and 514 (magnitude of 512 divided by 514) is increased, making it easier for a model or even a human to appreciate the distinguishing feature of AF demonstrated in 512. On the other hand, we could optionally decrease the magnitude ratio between 512 and 514 to train or test a model or a human, preparing for possible situations when distinguishing features are unfortunately less obvious. The magnified wavering waveform 512 is differential. Likewise, the PAC shown in FIG. 6B may be nonlinearly transformed such that the single distinct P wave 520 is magnified while the magnitude of the R waves 522 and 524 are less magnified. The magnified single distinct P wave 520 and the transformed R waves 522 and 524 are differential. An example of such non-linear magnification is companding. Other approaches include using logarithm and trigonometric tangent functions.

By changing the appearances of the distinguishing characteristic and the non-distinguishing characteristic of the parts-of-interest, the training dataset is enriched and thus model's blunt or severe mistakes are decreased.

In Step S404, label according to the differential first appearance and second appearance.

For example, an expert may label the augmented data samples based on the appearances of the distinguishing characteristic and the non-distinguishing characteristic of the parts-of-interest. This encourages the model to learn that "a waveform close to the wavering waveform 512 with no single distinct P wave as shown in FIG. 6A" is a distinguishing characteristic. Optional augmented labels can be derived from the history of transformations (such as "Is the signal zoomed in more than 2.5×") and the history of data augmentations (such as "Is there a positive signal put on the left side of the synthesized signal?").

It is noted that changing the appearance of a distinguishing characteristic and/or the appearance of a non-distinguishing characteristic of a part-of-interest can also be carried by other approaches. Exemplary approaches may be adjusting the transparency of the distinguishing characteristic (and/or the non-distinguishing characteristic), zooming in or zooming out the distinguishing characteristic (and/or the non-distinguishing characteristic), covering a part of, parts of or all of the non-distinguishing characteristic (and/or the distinguishing characteristic), skipping or removing some image pixels or some data points of the non-distinguishing characteristic (and/or the distinguishing characteristic), and etc., but the present application is not limited thereto. The approaches may depend on the form of data or may be taken based on the application required.

It is noted that in some applications the distinguishing characteristic is considered first in the data augmentation or label augmentation, in some applications the non-distinguishing characteristic is considered first in the data augmentation or label augmentation, and in some other applications, the distinguishing characteristic and the non-distinguishing characteristic may be even reversed.

It is noted that an appearance of the first distinguishing characteristic in a rare sample may be reproduced using already available samples. The rare sample and the available samples are in the training dataset before the training dataset is enriched, and the augmented sample set is formed using the available samples. Extra difficult samples can be collected to augment the sample set, depending on the errors observed.

Figure 5:
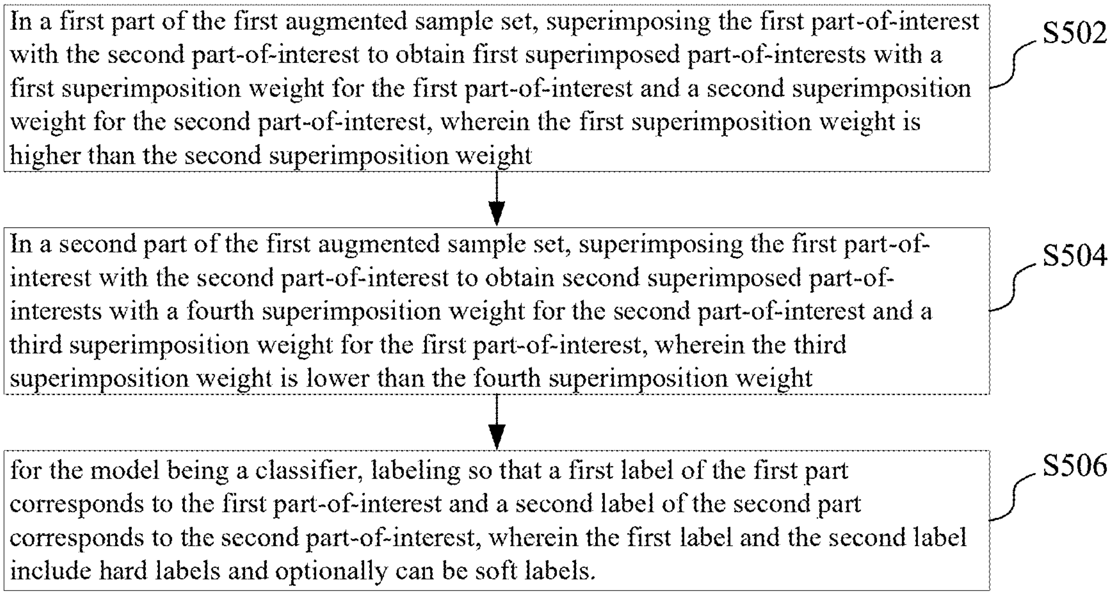
FIG. 5 is a flowchart of using data augmentation and corresponding labeling to add the augmented sample set according to an embodiment of the present application.

FIG. 5 is a flowchart of using data augmentation and corresponding labeling to add the augmented sample set according to an embodiment of the present application. In Step S202 of the method 200, the step of using the data augmentation and corresponding labeling to add the augmented sample set may include the following steps.

In Step S502, in a first part of the first augmented sample set, the first part-of-interest is superimposed with the second part-of-interest to obtain first superimposed parts-of-interest with a first superimposition weight for the first part-of-interest and a second superimposition weight for the second part-of-interest, wherein the first superimposition weight is higher than the second superimposition weight.

In Step S502, in a first part 506 (shown in FIG. 6C) of the first augmented sample set, the first part-of-interest $E_{502}$ (shown in FIG. 6A) is superimposed with the second part-of-interest $E_{504}$ (shown in FIG. 6B) to obtain first superimposed parts-of-interest $E_{506}$ (shown in FIG. 6C) with a first superimposition weight for the first part-of-interest $E_{502}$ and a second superimposition weight for the second part-of-interest $E_{504}$, wherein the first superimposition weight is higher than the second superimposition weight. The first part-of-interest $E_{502}$ is an AF. The second part-of-interest $E_{504}$ is a PAC. The first superimposed parts-of-interest $E_{506}$ is obtained according to an equation (1):

$$E_{506} = w \times E_{502} + (1 - w) \times E_{504} \quad (1)$$

where w is a superimposition weight between 0 and 1. In the Step S502, the first superimposition weight (i.e., w) is exemplarily 90%. The second superimposition weight (i.e., 1−w) is exemplarily 10%. In some implementations, the constant 1 in equation 1 can be larger or smaller than 1.

In Step S504, in a second part of the first augmented sample set, the first part-of-interest is superimposed with the second part-of-interest to obtain the second superimposed parts-of-interest with a fourth superimposition weight for the second part-of-interest and a third superimposition weight for the first part-of-interest, wherein the third superimposition weight is lower than the fourth superimposition weight.

In Step S504, in a second part 508 (shown in FIG. 6D) of the first augmented sample set, the first part-of-interest $E_{502}$ is superimposed with the second part-of-interest $E_{504}$ to obtain second superimposed parts-of-interest $E_{508}$ (shown in FIG. 6D) with a fourth superimposition weight for the second part-of-interest $E_{504}$ and a third superimposition weight for the first part-of-interest $E_{502}$, wherein the third superimposition weight is lower than the fourth superimposition weight. The second superimposed parts-of-interest $E_{508}$ is obtained according to equation (1). The fourth superimposition weight (i.e., 1-w in equation (1)) is exemplarily 90%. The third superimposition weight (i.e., w in equation (1)) is exemplarily 10%.

Referring to FIG. 6A, an exemplary waveform part in a dotted box 510 between two exemplary R waves 514 and 516 in the first part-of-interest $E_{502}$ is enlarged. As shown in the enlarged dotted box 510, the first distinguishing characteristic of the first part-of-interest $E_{502}$ is a wavering waveform 512 with no single distinct P wave during an RR interval (or between the two neighboring R waves 514 and 516). This is an AF and AF is more dangerous than normal and PAC rhythm. Chaotic or unstable RR intervals (e.g., 542, 544, and 546 with varying lengths) are common in AF.

Referring to FIG. 6B, an exemplary waveform part in a dotted box 518 between two exemplary R waves 522 and 524 in the second part-of-interest $E_{504}$ is enlarged. As shown in the enlarged dotted box 518, the second distinguishing characteristic of the second part-of-interest $E_{504}$ is a single distinct P wave 520 in an RR interval (or between two the R waves 522 and 524). This is a PAC and PAC is less dangerous. Chaotic or unstable RR intervals (e.g., 548, 550, and 552 with varying lengths) are common in PAC.

Figure 6C:
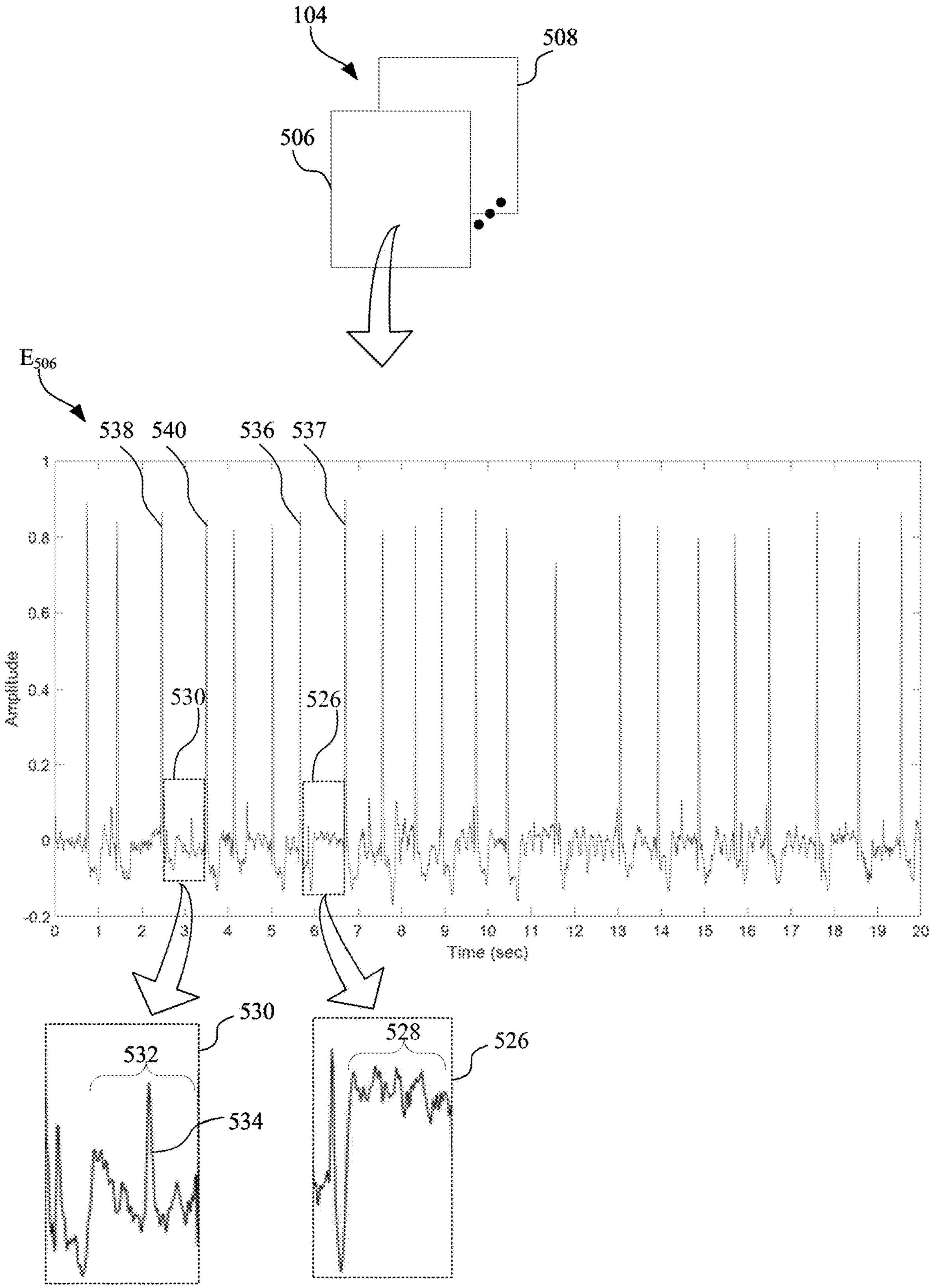
FIG. 6C is a schematic diagram showing a third type of data sample according to an embodiment of the present application.

Referring to FIG. 6C, in the first part 506 (which is a single sample), a first superimposition weight of the first distinguishing characteristic is higher than a second superimposition weight of the second distinguishing characteristic (AF has more weight than PAC, in the synthesized waveform $E_{506}$). An exemplary waveform part in a dotted box 526 between two exemplary R waves 536 and 537 in the first superimposed parts-of-interest $E_{506}$ is enlarged. As shown in the enlarged dotted box 526, a wavering waveform 528 with no distinctly tall wave appears during an RR interval. The first distinguishing characteristic with the first superimposition weight may be the wavering waveform 528 with no distinctly tall wave appearing during the RR interval. Another exemplary waveform in a dotted box 530 between two exemplary R waves 538 and 540 is enlarged. As shown in the enlarged dotted box 530, a wavering waveform 532 with a slightly distinctly tall wave 534 is less distinct than that of the distinct P wave 520. The slightly distinctly tall wave 534 results from an R wave 554 (shown in FIG. 6B) of the second part-of-interest $E_{504}$ having the second superimposition weight in the first part 506. The first distinguishing characteristic with the first superimposition weight may be a part of the wavering waveform 532 without the slightly distinctly tall wave 534.

Figure 6D:
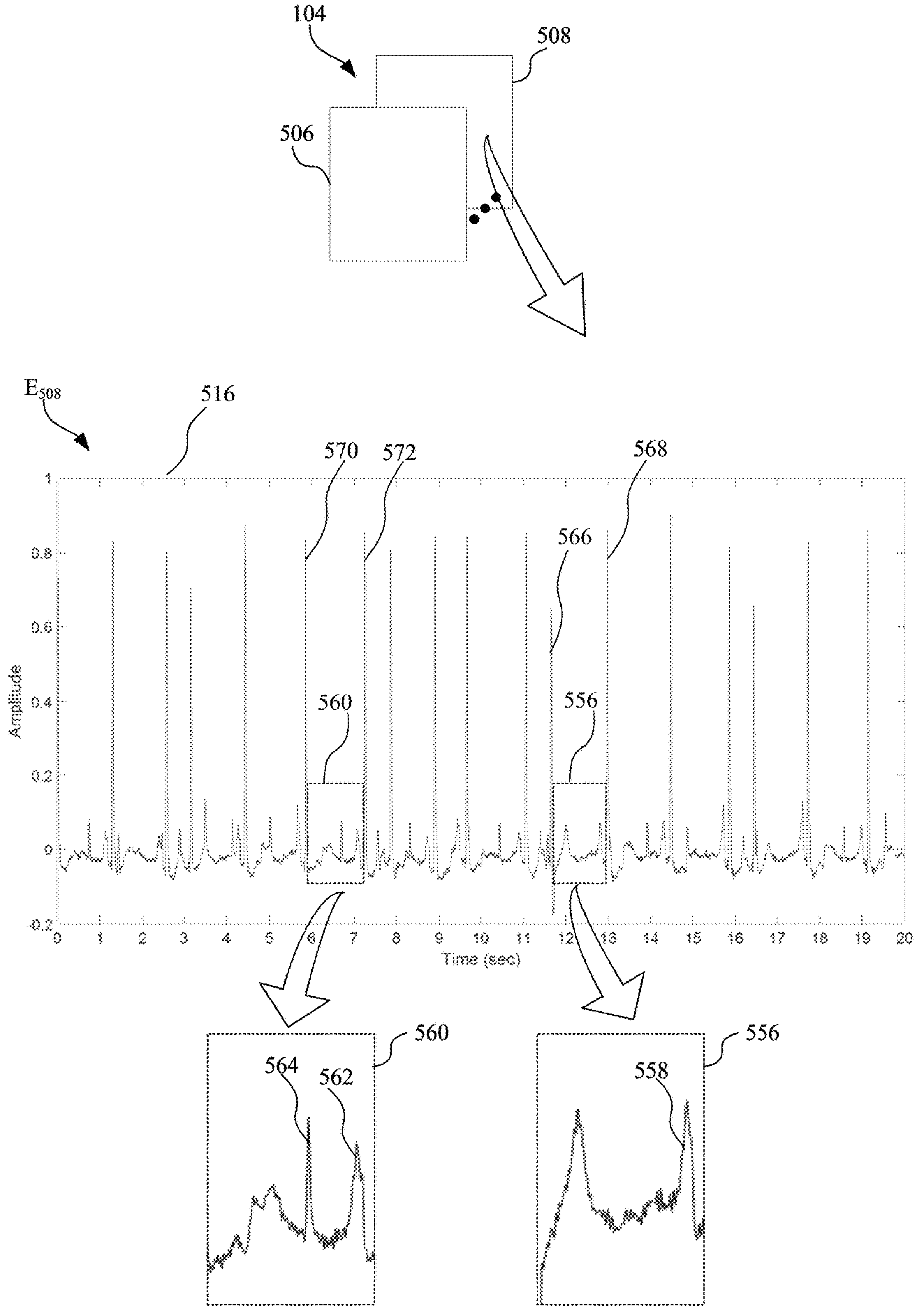
FIG. 6D is a schematic diagram showing a fourth type of data sample according to an embodiment of the present application.

Referring to FIG. 6D, in the second part 508 (which is a single sample), a fourth superimposition weight of the second distinguishing characteristic is higher than a third superimposition weight of the first distinguishing characteristic (PAC has more weight than AF, in the synthesized waveform $E_{508}$). An exemplary waveform part in a dotted box 556 between two exemplary R waves 566 and 568 in the second superimposed part-of interests $E_{508}$ is enlarged. As shown in the enlarged dotted box 556, a single distinctly tall wave 558 appears during an RR interval. The wave 558 is a P wave. The second distinguishing characteristic with the fourth superimposition weight may be the single distinct P wave 558. Another exemplary waveform in a dotted box 560 between two exemplary R waves 570 and 572 is enlarged. As shown in the enlarged dotted box 560, two distinctly tall waves 562 and 564 appear during an RR interval. Because in $E_{508}$ of FIG. 6D, the AF has low weight, the R waves appear like P waves, for example, 562 is a P wave of PAC, 564 is an R wave of AF but multiplied by 0.1 and thus looks like a P wave. The wave 562 is a P wave. The wave 564 results from an R wave of an AF waveform having the third superimposition weight in the second part 508. The second distinguishing characteristic with the fourth superimposition weight may be the P wave 562. Although synthesizing a less-weighted AF onto a more-weighted PAC makes this $E_{508}$ look unlike a typical PAC, the distinguishing part that can improve model's understanding or performance is that the wavering waveforms of 512 in FIG. 6A and 528 in FIG. 6C are less visible in $E_{508}$ of FIG. 6D. When we label $E_{508}$ in a way that it has less "AF" than $E_{502}$ and $E_{506}$, the model will be forced to pay attention to the wavering waveforms 512 and 528 instead of unstable RR intervals, since all of them (FIGS. 6A, B, C, and D) all have unstable RR intervals.

As described above with reference to FIGS. 6A and 6B, the first distinguishing characteristic (e.g., the wavering waveform 512) and the second distinguishing characteristic (e.g., the single distinct P wave 520) are differentiable. As described with reference to FIG. 6C, the first distinguishing characteristic with the first superimposition weight is more apparent than the second distinguishing characteristic with the second superimposition weight (the wavering waveform is more apparent than the single distinct P wave in FIG. 6C). As described with reference to FIG. 6D, the first distinguishing characteristic with the third superimposition weight is less apparent than the second distinguishing characteristic with the fourth superimposition weight (the wavering waveform is less apparent than the single distinct P wave in FIG. 6D). That is, the first distinguishing characteristic (e.g., the wavering waveform) is more apparent after superimposition as shown in FIG. 6C while the second distinguishing characteristic (e.g., the single distinct P wave) is more apparent after superimposition as shown in FIG. 6D.

The non-distinguishing characteristic (e.g., unstable RR intervals) in the superimposition remains almost unchanged but generates a set of combinations of the first distinguishing characteristic and the second distinguishing characteristic, some of which the first distinguishing characteristic is more apparent and some of which the second distinguishing characteristic is more apparent. Specifically, the first distinguishing characteristic with the first superimposition weight (e.g., the wavering waveform in FIG. 6C) has a first differentiable degree with respect to the second distinguishing characteristic with the fourth superimposition weight (e.g., the single distinct P wave in FIG. 6D). The first non-distinguishing characteristic (e.g., unstable RR intervals) with the first superimposition weight (e.g., R waves in FIG. 6C) has a second differentiable degree with respect to the second non-distinguishing characteristic (e.g., unstable RR intervals) with the fourth superimposition weight (e.g., R waves in FIG. 6D). The first differentiable degree is higher than the second differentiable degree. Therefore, AI is trained to rely on the characteristics of the first differentiable degree more than the second differentiable degree.

More specifically, with reference to FIGS. 6A and 6B, the first non-distinguishing characteristic (e.g., unstable RR intervals) of the first part-of-interest $E_{502}$ and the second non-distinguishing characteristic (e.g., unstable RR intervals) of the second part-of-interest $E_{504}$ are indifferentiable. After superimposition as shown in FIGS. 6C and 6D, the first non-distinguishing characteristic of the first superimposed parts-of-interest $E_{506}$ and the second non-distinguishing characteristic of the second superimposed parts-of-interest $E_{508}$ are also indifferentiable.

In Step S506, for the model being a classifier, labeling is performed so that a first label of the first part corresponds to the first part-of-interest and a second label of the second part corresponds to the second part-of-interest, wherein the first label and the second label include hard labels and optionally can be soft labels.

Referring to FIG. 5, in Step S506, for the model 108 being a classifier, the first part 506 and the second part 508 are labeled so that a first label of the first part 506 corresponds to the first part-of-interest $E_{502}$ and a second label of the second part 508 corresponds to the second part-of-interest $E_{504}$, wherein the first label and the second label are hard or soft labels. By labeling according to the differential first appearance and second appearance, during training the model with the training data set 100, the model 108 learns that the chaotic RR intervals described with reference to FIGS. 6C and 6D do not contain sufficient characteristics of the first part-of-interest. However, when chaotic RR intervals and wavering waveforms such as 512 in $E_{502}$ are both observed such as in FIG. 6C, one would conclude that there are sufficient characteristics of the first part-of-interest. The model 108 also learns that a waveform close to the first distinguishing characteristic of the first part-of-interest $E_{502}$ described with reference to FIG. 6A, such as the first distinguishing characteristic with the first superimposition weight described with reference to FIG. 6C, is a required characteristic of the first part-of-interest $E_{502}$ (i.e., a characteristic corresponding to the first distinguishing characteristic learned during training the model 108). The required characteristic of a part-of-interest would be a characteristic the model 108 is taught to learn from the distinguishing characteristic.

In some implementations, two augmented samples (such as 6A and 6B) can be fed into model and the differentiable degree assigned by human or derived from augmentation/transformation history can be served as part of the labels.

Figure 7:
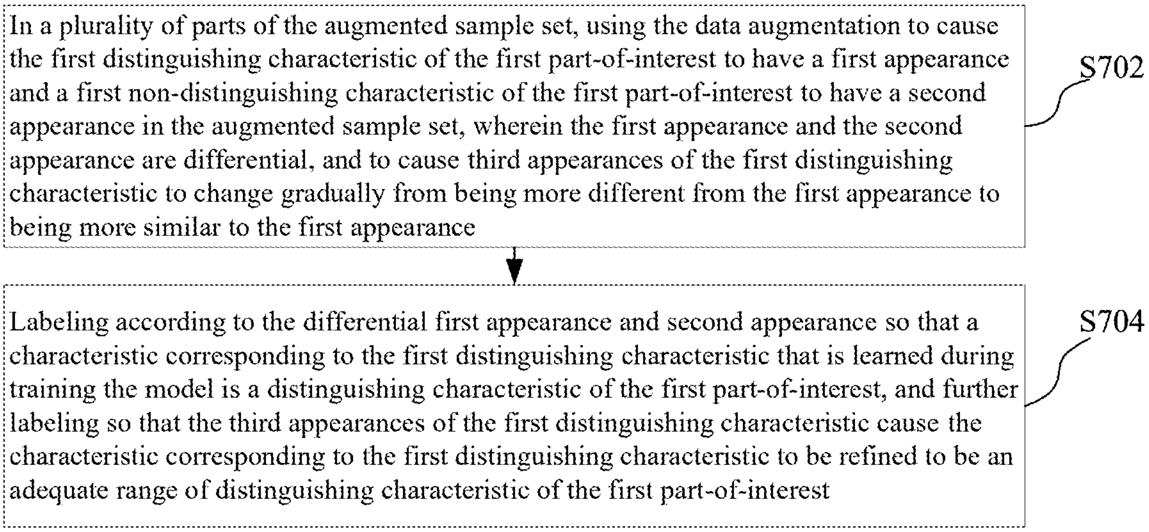
FIG. 7 is a flowchart of using data augmentation and corresponding labeling to add the augmented sample set according to an embodiment of the present application.

FIG. 7 is a flowchart of using data augmentation and corresponding labeling to add the augmented sample set according to an embodiment of the present application. In Step S202 of the method 200, the step of using the data augmentation and corresponding labeling to add the augmented sample set may include the following steps.

In Step S702, in a plurality of parts of the augmented sample set, the data augmentation is used to cause the first distinguishing characteristic of the first part-of-interest to have a first appearance (see the wavering waveform 528 in FIG. 6C) and a first non-distinguishing characteristic of the first part-of-interest to have a second appearance (see chaotic RR intervals in FIG. 6C or 6D) in the augmented sample set. The first appearance and the second appearance are differential.

The data augmentation is also used to cause third appearances of the first distinguishing characteristic to change gradually from being more different from the first appearance to being more similar to the first appearance. For example, the plurality of parts of the augmented sample set have different weights w in equation (1). By gradually increasing the weight w in Equation 1, the appearance of a distinguishing characteristic of a part-of-interest will gradually increase. This step is to have samples with third appearances of the first distinguishing characteristic to enrich the training dataset. The third appearances of the first distinguishing characteristic are transitioned from being different from the first appearance to being the same as or similar to the first appearance.

In Step S704, this step is similar to Step S506 in FIG. 5. However, in addition to labeling according to the differential first appearance and second appearance so that a characteristic corresponding to the first distinguishing characteristic that is learned during training the model is a distinguishing characteristic of the first part-of-interest, other parts of the augmented sample set are also labeled so that the third appearances of the first distinguishing characteristic cause the characteristic corresponding to the first distinguishing characteristic to be refined to be an adequate range of distinguishing characteristic of the first part-of-interest. For example, the distinguishing characteristic of the first part-of-interest corresponds to a weight w in equation (1) is equal to 50%, and an adequate range of the distinguishing characteristic of the first part-of-interest corresponds to a weight w in equation (1) is in an arbitrary desired interval, for example, between 50% and 100%. Desired model sensitivity and specificity can be tuned from the range, for example, we want a more sensitive model, then we choose to label 30% to 100% to be our adequate range. If we want a less sensitive model, then we choose 60% to 100% to be an adequate range. For a non-distinguishing character such as sinusoidal 60 Hz powerline noises, regardless of the weighting used in the superimposition, we could optionally not change the original label. That is, an AF superimposed with any weightings of powerline noises is still an AF. A PAC superimposed with any weightings of powerline noises is still a PAC. However, we could optionally choose to train an AI model to output 'Indeterminate' or 'Cannot decide due to quality' when such noise is in an arbitrary range such as 80% to 100%, depending on the application.

In some embodiments, the data augmentation allows regions of interest to be selected in a sample to reflect the desired adequate range of the characteristic. One or more parts in the sample may be transformed (selected, removed, cropped, zoomed, covered, and other transformations) to reflect an adequate range that is deemed to be important enough for a model to behave differently or not. The adequate range is to be determined by another algorithm(s), expert(s), or their combinations.

In some embodiments, the first parts are separated by a threshold into a plurality of first groups that correspond to an inadequate range of the distinguishing characteristic and the adequate range of the distinguishing characteristic, respectively. For example, an adequate range of the distinguishing characteristic may correspond to a weight w in equation (1) higher than 50% and an inadequate range of the distinguishing characteristic may correspond to a weight w in equation (1) lower than 50%. The 50% is a threshold to determine an adequate range of the distinguishing characteristic and an inadequate range of the distinguishing characteristic. The threshold may be adjusted depending on the application required and may be adjusted according to an indicator of the performance of the model. The indicator can be a sensitivity and specificity requirement of the model. The indicator can also be the qualitative errors a model is making. For example, missing characteristic A causes 1% of patients to lose lives, while missing characteristic B causes 1% of patients to feel weak. Despite quantitatively they both miss 1% of the patients, we could prioritize characteristic A to have higher sensitivity used in this invention.

Figure 8:
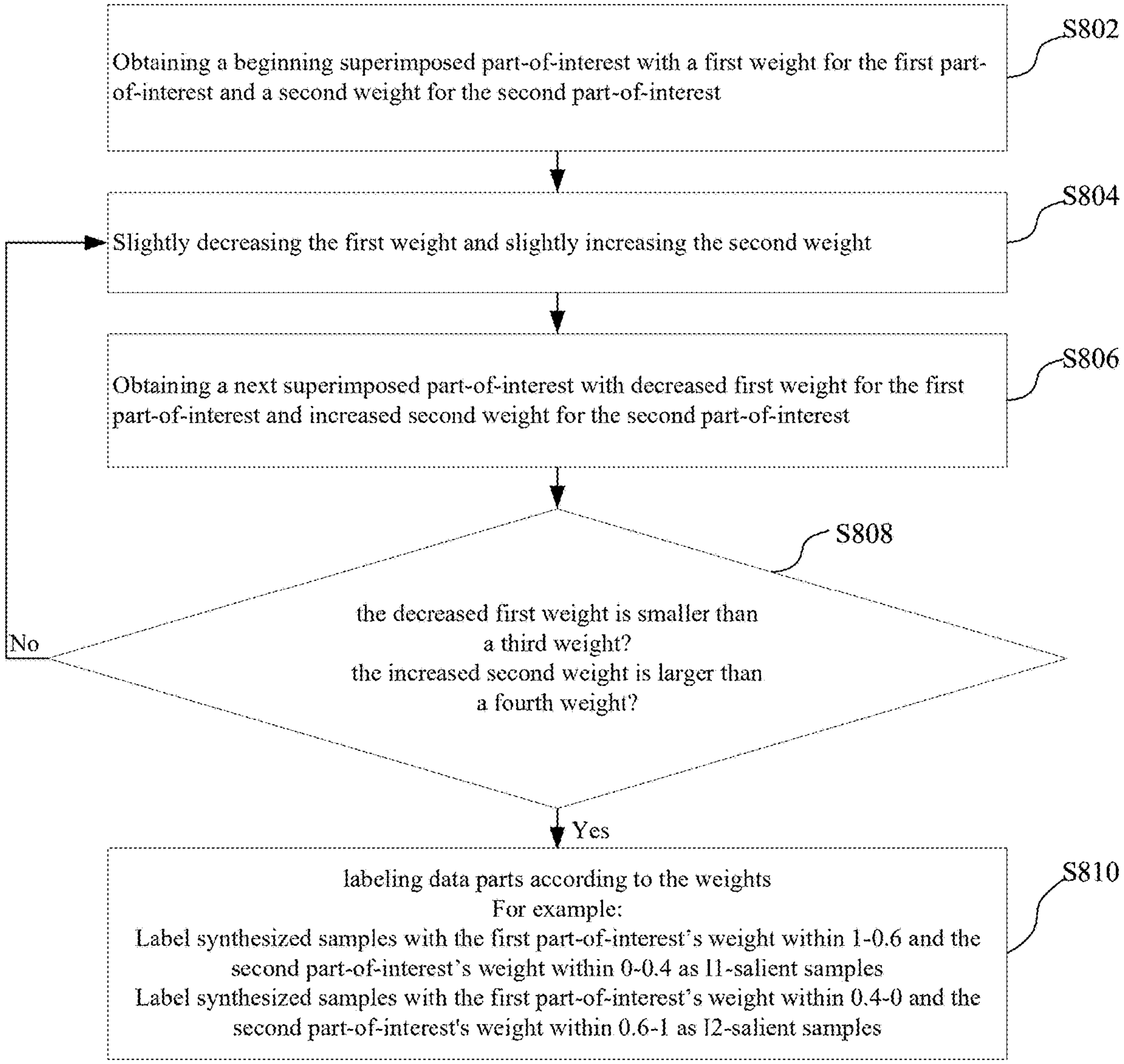
FIG. 8 is a flowchart of using data augmentation and corresponding labeling to add the augmented sample set according to an embodiment of the present application.

FIG. 8 is a flowchart of using data augmentation and corresponding labeling to add the augmented sample set according to an embodiment of the present application. In Step S202 of the method 200, the step of using the data augmentation and corresponding labeling to add the augmented sample set may include the following steps.

In Step S802, the first part-of-interest is superimposed with the second part-of-interest to obtain a beginning superimposed part-of-interest with a first weight for the first part-of-interest and a second weight for the second part-of-interest. The first weight may be higher than the second weight. Above Equation (1) may be employed here. The first weight may be 1, and the second weight may be 0. That is, during the superimposition of the first part-of-interest and the second part-of-interest, the weight for the first part-of-interest may start decreasing from 1 (or 100%), and the weight for the second part-of-interest may start increasing from 0 (or 0%). Other values of weights for the first and second parts-of-interest may also applicable, depending on the situations. In other cases, the weight for the first part-of-interest increases while the weight for the second part-of-interest decreases. Step 802 is similar to Step S502 in FIG. 5, and details are not repeated herein.

In Step S804, the first weight is slightly decreased and the second weight is slightly increased. For example, the first weight is slightly decreased from 1 to 0.9 and the second weight is slightly increased from 0 to 0.1. The sum might be 1 (or 100%) or not, depending on the acceptable dynamic range of final synthesized data.

In Step S806, the first part-of-interest is superimposed with the second part-of-interest to obtain a next superimposed part-of-interest with decreased first weight (e.g., 0.9) for the first part-of-interest and increased second weight (e.g., 0.1) for the second part-of-interest. After the weight is gradually changed, additional augmented samples are obtained.

In Step S808, whether the decreased first weight is smaller than a third weight and whether the increased second weight is larger than a fourth weight are determined. For example, the third weight is 0, and the fourth weight is 1, that is, in order to obtain the superimposed parts-of-interest (or the synthesized samples), the weight of the first part-of-interest decreases from 1 to 0, and the weight of the second part-of-interest increases from 0 to 1, for example. That is, decreasing the weight for the first part-of-interest may stop at 0 (or 0%), and increasing the weight for the second part-of-interest may stop at 1 (or 100%). Other values of weights for the first and second parts-of-interest may also applicable, depending on the situations. However, the invention is not limited to this one-step decreasing/increasing. Two-step, three-step or any-step decreasing/increasing may be employed here. For example, the first weight may decrease from 1 to 0.6 and from 0.4 to 0 in two steps. Correspondingly, the second weight may increase from 0 to 0.4 and from 0.6 to 1 in two steps. In other cases, any suitable ranges of the weights for the first part-of-interest and the second part-of-interest may be picked.

In Step S810, for the model being a classifier, labeling is performed according to the weights so that a plurality of respective labels of the parts or synthesized samples are separated by one or more thresholds into a plurality of groups that correspond to an inadequate range of the distinguishing characteristic (e.g., the first part-of-interest is less salient with the weights from 0.4 to 0) and an adequate range of the distinguishing characteristic (e.g., the first part-of-interest is more salient with the weights from 1 to 0.6), respectively. For example, assuming that a synthesized sample with more salient first part-of-interest is called an I1-salient sample and a synthesized sample with more salient second part-of-interest is called an 12-salient sample, the I1-salient samples may be with the decreased first weight ranged from 1 to 0.6 and the increased second weight ranged from 0 to 0.4; and the 12-salient samples may be with the decreased first weight ranged from 0.4 to 0 and the increased second weight ranged from 0.6 to 1. The ranges of weights for determining whether a synthesized sample is the I1-salient sample or the 12-salient sample may be set according to actual needs. It is labeled as the I1-salient sample when the weight for the first part-of-interest is greater than 0.6, where 0.6 is a threshold for I1-salient samples; likewise, it is labeled as the 12-salient sample when the weight for the second part-of-interest is greater than 0.6, where 0.6 is a threshold for 12-salient samples. It is noted that the invention is not limited to these exemplary threshold values. It is noted that the labeling can be performed after all the synthesized samples are obtained, or when each synthesized sample is obtained.

In some embodiments, a basic learning part is superimposed with an enhancing part. They are superimposed with a first superimposition weight (e.g., w) for the basic learning part and a second superimposition weight (e.g., 1−w) for the enhancing part. The basic learning part has the first distinguishing characteristic of the first part-of-interest and the first non-distinguishing characteristic of the first part-of-interest, and the first distinguishing and non-distinguishing characteristics have appearances differential in a first manner. The enhancing part has the first distinguishing characteristic of the first part-of-interest and the first non-distinguishing characteristic of the first part-of-interest, and the first distinguishing and non-distinguishing characteristics have appearances differential in a second manner opposite to the first manner. Labeling is performed according to one of the appearances (or the data augmentation parameters) differential in the first manner or the appearances differential in the second manner, and further the labeling is performed according to the differential first superimposition weight and second superimposition weight so that the other one of the appearances (or the data augmentation parameters) differential in the first manner or the appearances differential in the second manner is implicitly labeled.

In addition to train a first model using a first training dataset enriched by a first augmented sample set generated by any implementation of the foregoing method, the present application further provides a method for training a second model using a second training dataset enriched by a second augmented sample set generated by any implementation of the foregoing method for differentiating a plurality of parts-of-interest from each other. The first model and the second model may be trained using different apparatuses. The first model may be connected in parallel to the second model in a neural network. The first model may be connected in series with the second model in a neural network.

Figure 9A:
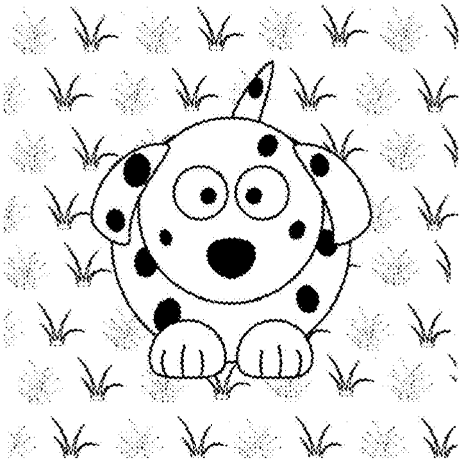
FIG. 9A is a schematic diagram for explaining that most dog samples appear on grass.
Figure 9B:
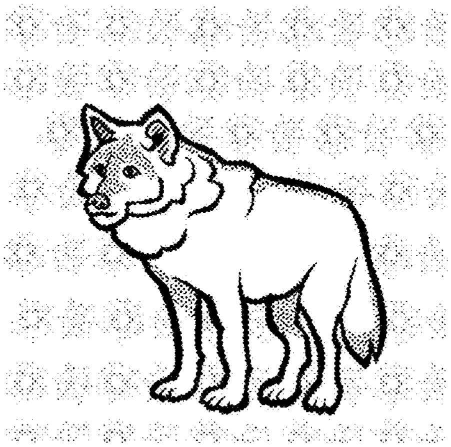
FIG. 9B is a schematic diagram for explaining that most wolf samples appear on snow.
Figure 9C:
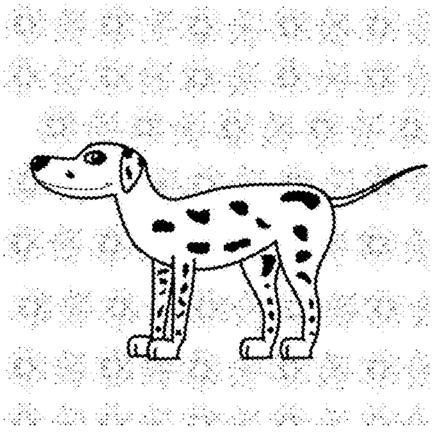
FIG. 9C is a schematic diagram for explaining that a naturally biased mistake is made since AI misclassifies a dog on snow as a wolf.
Figure 10A:
FIG. 10A is a schematic diagram illustrating a cropped dog synthesized onto clean snow background (Label as a dog), in which the unnatural boundary between dog and snow is an example of a synthesis artifact.
Figure 10B:
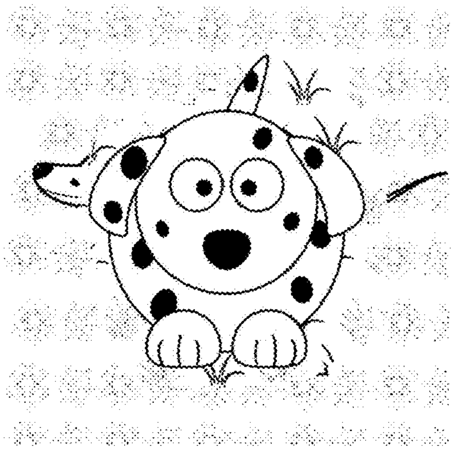
FIG. 10B is a schematic diagram illustrating a cropped dog synthesized to cover a dog on snow (Label as a dog).
Figure 10C:
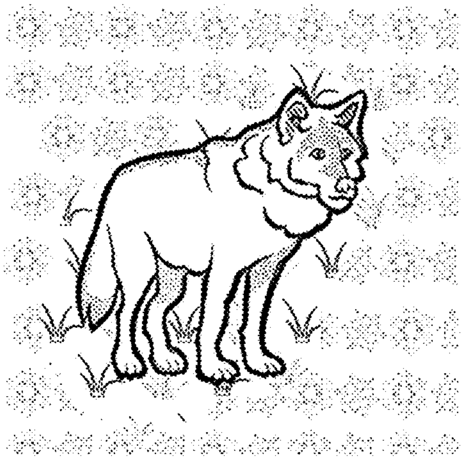
FIG. 10C is a schematic diagram illustrating a synthesized wolf on snow (Label as a wolf).

FIGS. 9, 10 and 11 demonstrate the benefits of the above-described invention. FIG. 9 is a visualization of unmet needs described in the context. Briefly, a sample of a dog on snow is rare and often mistaken by AI as a wolf because AI overfits the correlation between snow and wolf, and fails to comprehend that dog can appear on snow, too. FIG. 10 demonstrates how to synthesize rare samples (e.g., dog on snow) by mosaicking or superimposing parts-of-interest together to create rare samples. FIGS. 10A and 10B demonstrate how such synthesis could unwantedly create a synthesis artifact. To avoid AI overfitting such synthesis artifact to a class of image (e.g., dog), we therefore also synthesize images for another class (e.g., wolf, FIG. 10C), so that AI would be trained to ignore the synthesis artifact because it appears in both classes. Although the above example uses two-class classification, the same principle is also applicable to multiclass classification or regression.

Figure 11A:
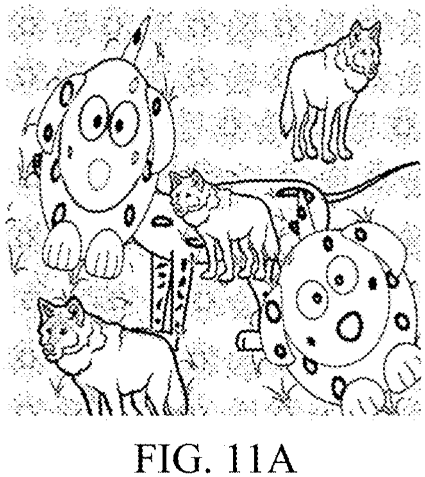
FIG. 11A is a schematic diagram illustrating two dogs and three wolfs synthesized onto FIG. 9C.
Figure 11B:
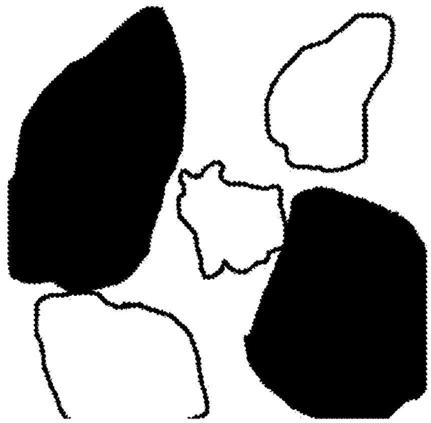
FIG. 11B is a schematic diagram illustrating segmented regions of dogs and wolfs in FIG. 11A.

FIG. 11 demonstrates an example of using data augmentation history to create a meaningful free label. Because in FIG. 9C a dog on snow is mistaken by AI, we synthesize one or multiple images that were cropped or transformed from other samples. For example, in FIG. 11A, we synthesized two dogs and three wolfs onto FIG. 9C. We could simply ask AI to predict how many dogs and wolfs are in FIG. 11A. Or we could ask AI to segment FIG. 11A into regions of dog and wolf, such as shown in FIG. 11B.

For the dog vs wolf example, the prior art might augment training data via transformations that affect both distinguishing and non-distinguishing characteristics. For example, color swapping transformation between the yellow and the white might reduce the overfitting between snow and the wolf, because in transformed data, now snow appears yellow and looks like mud. Unfortunately, such color swapping is also applied to the distinguishing characteristics (e.g., animal's body), therefore, the AI will be unwantedly trained to be color-blind between yellow and white even on animal's body and therefore might mistake a white swan as a yellow duck. In summary, prior art of data augmentation might increase performance in 'dog vs wolf' but simultaneously decrease the performances in 'duck vs swan'. Such drawback is avoided in our invention because we transform distinguishing and non-distinguishing characteristics differently.

The present application further provides a method for using a second model for differentiating a plurality of parts-of-interest from each other. The second model is trained using a second training dataset enriched by a second augmented sample set generated by any implementation of the foregoing method. For brevity, details will not be described herein again.

The present application further provides a method for using a second model to infer a dataset. The second model is for differentiating a plurality of parts-of-interest from each other and is trained using a second training dataset enriched by a second augmented sample set generated by any implementation of the foregoing method. For brevity, details will not be described herein again.

The present application further provides an apparatus including a memory storing a plurality of program instructions and a processor coupled to the memory, wherein the program instructions, when called or run by the processor, cause the processor to execute any implementation of the foregoing method. For brevity, details will not be described herein again.

The present application further provides a computer readable storage medium for storing a computer program. The computer readable storage medium enables a computer to execute any implementation of the foregoing method. For brevity, details will not be described herein again.

The present application further provides a computer program product including computer program instructions. The computer program product enables a computer to execute any implementation of the foregoing method. For brevity, details will not be described herein again.

The present application further provides a computer program. The computer program enables a computer to execute any implementation of the foregoing method. For brevity, details will not be described herein again.

A person having ordinary skill in the art understands that each of the units, algorithm, and steps described and disclosed in the embodiments of the present application are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present application. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present application can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used as a service and/or sold as a product, it can be stored in a readable storage medium in a computer. Based on this understanding, the technical plan proposed by the present application can be basically or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present application. The storage medium includes a USB disk, a mobile hard disk, a read-only memory (ROM), a random access memory (RAM), a floppy disk, or other kinds of media capable of storing program codes.

While the present application has been described in connection with what is considered the most practical and preferred embodiments, it is understood that the present application is not limited to the disclosed embodiments but is intended to cover various arrangements made without departing from the scope of the broadest interpretation of the appended claims.

What is claimed is:

1. A method for learning a generalizable principle of a first distinguishing characteristic, comprising:

processing an enriched first training dataset using a first model in a first training apparatus, the enriched first training dataset being tuned via data augmentation and corresponding labeling or tuned via label augmentation to a generalizable principle of a first distinguishing characteristic, wherein the first distinguishing characteristic is for differentiating a first part-of-interest from a second part-of-interest; and processing a second dataset using a second model, the processing comprising predicting or inferring outputs or middle layer outputs of the first model or reconstructing inputs or middle layer outputs of the first model and enriching the second dataset such that the second model learns the generalizable principle of the first distinguishing characteristic.

2. The method of claim 1, further comprising outputting one of a classifier with a label, a regressor with a label, or a reconstructor that maps pixels between a first image and a second image.

3. The method of claim 1, wherein processing the second dataset comprises using the enriched first training dataset as an augmented label for reconstructing first data from the second dataset.

4. The method of claim 1, wherein the predicted or inferred outputs or middle layer outputs of the first model or the reconstructed inputs or middle layer outputs of the first model comprise one or more of vector representations, regions, one-dimensional data, multi-dimensional data, or points.

5. The method of claim 1, comprising training the second model to map or synthesize the outputs or the middle layer outputs of the first training apparatus.

6. A method for learning a generalizable principle of a first distinguishing characteristic, comprising:

processing an enriched first training dataset created by a first model in a first training apparatus, the enriched first training dataset being tuned via data augmentation and corresponding labeling or tuned via label augmentation to a generalizable principle of a first distinguishing characteristic, wherein the first distinguishing characteristic is for differentiating a first part-of-interest from a second part-of-interest; and processing a second dataset using a second model, the processing comprising predicting, inferring, synthesizing, or transforming the outputs or the middle layer outputs of the processed enriched first training dataset of the first model and enriching the second dataset such that the second model learns the generalizable principle of the first distinguishing characteristic.

7. The method of claim 6, comprising, in response to a failure indicia that the second model failed to differentiate the first part-of-interest from the second part-of interest, performing data augmentation and corresponding labeling or label augmentation on the second dataset to train the second model.

8. The method of claim 6, comprising, in response to an indicia that the second model overfitted one of the first part-of-interest or the second part-of interest, iteratively perform data augmentation and corresponding labeling or label augmentation on the second dataset to train the second model.

9. The method of claim 6, wherein processing the enriched first training dataset further comprises processing the results of the corresponding labeling or label augmentation and reconstructing the enriched first dataset.

10. A method for learning a generalizable principle of a first distinguishing characteristic, comprising:

processing an enriched first training dataset that has been enriched by a first model in a first training apparatus, the enriched first training dataset being tuned via data augmentation and corresponding labeling or via label augmentation to a generalizable principle of a first distinguishing characteristic, wherein the first distinguishing characteristic is for differentiating a first part-of-interest from a second part-of-interest; and processing a second dataset with a second model in a second training apparatus, the second model configured to:

predict or infer outputs or middle layer outputs of the first model acting on the processed enriched first training dataset or generate or reconstruct inputs or representations of the first model acting on the processed enriched first training dataset; and classify the contents of the second dataset with the predictions or inferences such that the second model learns the generalizable principle of the first distinguishing characteristic.

11. The method of claim 10, comprising, in response to a failure indicia that the first part-of-interest was not differentiated from the second part-of interest, iterating the data augmentation step, the labeling step, and the training step.

12. The method of claim 10, comprising, in response to an indicia of overfitting to the second part-of-interest, iterating the data augmentation step, the labeling step, and the training step.

13. The method of claim 10, comprising enriching the second dataset by transforming a first appearance of the first distinguishing characteristic.

14. The method of claim 10, comprising enriching the second dataset by transforming an appearance of a non-distinguishing characteristic.

15. The method of claim 14, wherein the enriching comprises duplicating an artifact.

16. A training apparatus for a generalizable principle of a distinguishing characteristic, comprising a memory storing a plurality of program instructions and a processor coupled to the memory, wherein the program instructions, when called or run by the processor, cause the processor to execute the steps of:

accessing an enriched first training dataset created by a first model in a first training apparatus, the enriched first training dataset being tuned via data augmentation and corresponding labeling or via label augmentation to a generalizable principle of a first distinguishing characteristic, wherein the first distinguishing characteristic is for differentiating a first part-of-interest from a second part-of-interest;

processing the enriched first training dataset with a second model, the second model predicting or inferring outputs or middle layer outputs from the first model or from the enriched first training dataset or reconstructing inputs or representations of the first training apparatus; and processing, with the second model, a second dataset with the predictions, reconstructions, or inferences such that the generalizable principle of the first distinguishing characteristic is classified in the second dataset.

* * * * *